US008707259B2

(12) United States Patent
Trofin et al.

(10) Patent No.: US 8,707,259 B2
(45) Date of Patent: Apr. 22, 2014

(54) FRAMEWORK FOR OPEN DYNAMIC REFLECTIVE APPLICATIONS

(75) Inventors: Mircea Trofin, Redmond, WA (US); Oleg G. Lvovitch, Seattle, WA (US); Blake W. Stone, Bellevue, WA (US); Krzysztof J. Cwalina, Sammamish, WA (US); Clemens A. Szyperski, Redmond, WA (US); Alex Bulankou, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1261 days.

(21) Appl. No.: 12/273,605

(22) Filed: Nov. 19, 2008

(65) Prior Publication Data

US 2010/0125558 A1    May 20, 2010

(51) Int. Cl.
G06F 9/44    (2006.01)

(52) U.S. Cl.
USPC ......................................................... 717/120

(58) Field of Classification Search
USPC .......................... 717/100, 106–108, 120–123
See application file for complete search history.

(56) References Cited

U.S. PATENT DOCUMENTS

| 6,212,673 | B1 | 4/2001 | House et al. |
| 6,668,370 | B1 | 12/2003 | Harmon et al. |
| 6,671,875 | B1 | 12/2003 | Lindsey et al. |
| 7,124,062 | B2 * | 10/2006 | Gebhart ........................ 702/186 |
| 7,219,328 | B2 * | 5/2007 | Schloegel et al. ............. 717/104 |
| 7,584,454 | B1 * | 9/2009 | Massoudi ...................... 717/121 |
| 7,962,470 | B2 * | 6/2011 | Degenkolb et al. ........... 707/709 |
| 2003/0217044 | A1 * | 11/2003 | Zhang et al. ...................... 707/3 |
| 2004/0017392 | A1 * | 1/2004 | Welch ............................ 345/738 |
| 2004/0044990 | A1 * | 3/2004 | Schloegel et al. ............. 717/113 |
| 2004/0064554 | A1 * | 4/2004 | Kuno et al. .................... 709/225 |
| 2004/0133580 | A1 * | 7/2004 | Liu et al. ........................ 707/100 |
| 2004/0205528 | A1 * | 10/2004 | Alexander ..................... 715/505 |
| 2005/0125771 | A1 * | 6/2005 | Vitanov et al. ................. 717/104 |
| 2005/0149294 | A1 * | 7/2005 | Gebhart ........................ 702/186 |
| 2005/0154785 | A1 * | 7/2005 | Reed et al. ..................... 709/217 |
| 2006/0101381 | A1 | 5/2006 | Hussey |
| 2006/0101388 | A1 | 5/2006 | Amsden et al. |
| 2007/0168917 | A1 * | 7/2007 | Janson .......................... 717/101 |
| 2007/0266384 | A1 * | 11/2007 | Labrou et al. ................. 718/100 |
| 2007/0282879 | A1 * | 12/2007 | Degenkolb et al. ........... 707/101 |
| 2007/0286076 | A1 * | 12/2007 | Roever et al. ................. 370/230 |
| 2007/0300240 | A1 * | 12/2007 | Viegener et al. .............. 719/320 |
| 2008/0127234 | A1 | 5/2008 | Hesmer et al. |

OTHER PUBLICATIONS

Medjahed et al., "Composing Web services on the Semantic Web," Sep. 23, 2003, Springer-Verlag, p. 333-351.*

(Continued)

Primary Examiner — Qing Chen
(74) Attorney, Agent, or Firm — Tony Azure; Andrew Sanders; Micky Minhas

(57) ABSTRACT

A framework for open, dynamic, and reflective applications contains high level metadata that define blocks of composable elements using a service definition, which defines specific keys for using the block of code. The service definition may be exported from the code using reflection without having to load the code into memory, and decisions on which block of code and how to load the code may be made at runtime. The composable elements may be grouped into composable parts. Composable part definitions may be used to instantiate or produce composable parts. At runtime, dynamic applications may search from many composable elements, and instantiate and execute the composable element as part of the application.

22 Claims, 4 Drawing Sheets

(56) References Cited

OTHER PUBLICATIONS

Chafle et al., "Decentralized Orchestration of Composite Web Services," May 2004, ACM, p. 134-143.*

Hull et al., "Tools for Design of Composite Web Services," Jun. 2004, ACM.*

Benatallah et al., "Facilitating the Rapid Development and Scalable Orchestration of Composite Web Services," 2005, Springer Science + Business Media, Inc., p. 5-37.*

Poole, John D., "Model-Driven Architecture: Vision, Standards and Emerging Technologies", Retrieved at <<http://www.adaptiveobjectmodel.com/ECOOP2001/submissions/Model-Driven__Architecture.pdf>>, Workshop on Metamodeling and Adaptive Object Models, Apr. 2001, pp. 15.

Bernstein, et al., "A Vision for Management of Complex Models", Retrieved at <<http://www.csd.uoc.gr/~hy562/Papers/blp00.pdf>>, Technical Report 2000-53, Jun. 2000, pp. 19.

Kilgore, Richard A., "Multi-Language, Open-Source Modeling using the Microsoft .Net Architecture", Retrieved at <<http://ieeexplore.ieee.org/iel5/8343/26360/01172940.pdf?tp=&isnumber=&arnumber=1172940>>, Proceedings of the Winter Simulation Conference, vol. 1, Dec. 8-11, 2002, pp. 629-633.

Venkatasubramanian, et al., "Design and Implementation of a Composable Reflective Middleware Framework", Retrieved at <<http://www.ics.uci.edu/~dsm/papers/techreport/composetech.pdf>>, Proceedings of the 21st International Conference on Distributed Computing Systems, 2001, pp. 1-27.

Leclercq, et al., "DREAM: A Component Framework for Constructing Resource-Aware, Configurable Middleware", Retrieved at <<http://ieeexplore.ieee.org/iel5/8968/32607/01524868.pdf?tp=&isnumber=&arnumber=1524868>>,The IEEE Computer Society, vol. 6, No. 9, Sep. 2005, pp. 1-12.

Lumpe, Markus., "GLoo: A Framework for Modeling and Reasoning about Component-Oriented Language Abstractions", Retrieved at <<http://www.cs.iastate.edu/~lumpe/Pubs/CBSE06.pdf>>, Proceedings of the 9th International Conference on Component-Based Software Engineering, 2006, pp. 16.

* cited by examiner

FRAMEWORK FOR OPEN DYNAMIC REFLECTIVE APPLICATIONS

BACKGROUND

Reusing software code is a common practice. A routine or group of routines may be developed, tested, and used over a long period of time with a high degree of confidence. Rather than re-write the routines, new applications may incorporate the previous routines into the new application. This practice cuts down on development time, but also increases the reliability of the overall applications, since it may be built on code that is tested and known.

Code is frequently reused within a specific programming environment. Many programming environments have mechanisms for developing and sharing libraries of routines. When code is shared, there are some metadata that are known about the code. For example, a routine may have certain parameters as input and may return other parameters. The input parameters may have a simple type specification, such as integer or string, but the input parameters may also have specific formatting or range limitations, as may the output parameters. In order to properly use the routine, a programmer will provide the input parameters within the constraints of the routine.

While many programming environments may have different mechanisms for expressing the dependencies of a routine, the mechanisms often do not work across different programming environments.

SUMMARY

A framework for open, dynamic, and reflective applications contains high level metadata that define blocks of composable elements using a service definition, which defines specific keys for using the block of code. The service definition may be exported from the code using reflection without having to load the code into memory, and decisions on which block of code and how to load the code may be made at runtime. The composable elements may be grouped into composable parts. Composable part definitions may be used to instantiate or produce composable parts. At runtime, dynamic applications may search from many composable elements, and instantiate and execute the composable element as part of the application.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
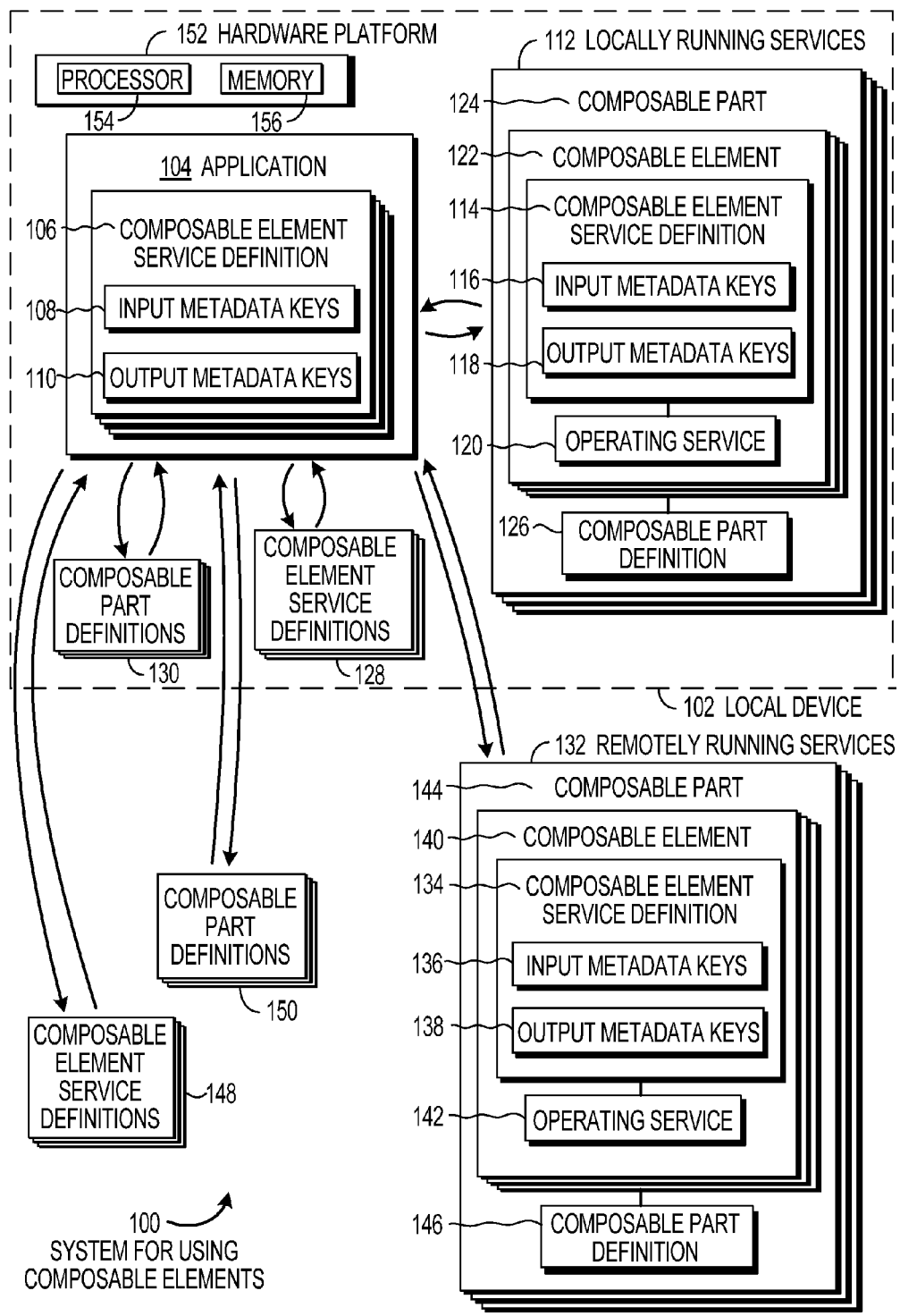
FIG. 1 is a diagram illustration of an embodiment showing a system for using composable elements.

A framework for open, dynamic, and reflective applications uses metadata that defines composable elements. Using metadata defined in a service definition for a composable element, an application may search for and select a composable element that can be instantiated and used by the application. The composable elements may be grouped together and manipulated in one or more composable parts.

Because metadata is exposed for composable elements and groups of composable elements as composable parts, searching for composable elements that meet various criteria may be done without loading the elements into memory and analyzing the elements individually.

In many embodiments, the metadata may be available for individual composable elements as well as composable parts, which may contain multiple composable elements. An application may search the metadata to find a composable element or composable part. In many cases, an application may search through several potential candidates and select a composable part or group of composable elements that best meet the predefined criteria. Many embodiments may have compulsory and optional portions of metadata that is searched.

The framework may enable an application to dynamically configure portions of the application at runtime. Because elements are selected at runtime, the application may use the most up to date elements.

The framework may enable any type of service to be made available to be incorporated or used by an application. In order to be used, a service may expose a service definition that may contain metadata keys for input to and output from the service. The service definition may be analyzed prior to loading the service in memory, and the service definition may include information used by the application to interface to the service.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a system for using composable elements. Embodiment 100 is a simplified example of the interactions of an application and various composable elements that may be dynamically joined to the application.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 illustrates a local device 102 that operates an application 104. Within the application 104, a service definition 106 may be defined that includes input metadata keys 108 and output metadata keys 110. The metadata keys define input and output parameters that are expected for a composable element. Using the service definition 106, the application 104 may identify a matching composable element or group of composable elements. The matching composable element may be instantiated and operated with the application 104.

The application 104 may search the metadata that are exposed by various composable elements to find a composable element that meets the desired service definition. In many cases, the application 104 may search for composable elements that may be grouped together in a composable part.

Throughout this specification and claims, a composable element may be defined as a service, function, routine, or other executable that may receive an input and return an output. In some cases, a composable element may be a large software system that may include many components. In other cases, a composable element may be a small function or routine. In some embodiments, the composable element may be a hardware device that responds to specific inputs and generates certain outputs. Such a device may or may not have software components. The composable elements may expose a metadata description of the input and output parameters, as well as other information about the composable element.

Throughout this specification and claims, a composable part may be a group of composable elements. In some embodiments, a composable part may expose a metadata description that is the sum of the composable elements. Some composable parts may additionally expose a metadata description of the composable part as a whole.

Throughout this specification and claims, parameters may be described as 'input' and 'output' parameters. In order to simplify the nomenclature, this specification and claims will refer to these parameters from the perspective of the composable element. An 'input parameter' would be any parameter that is sent from an application to a composable element. Likewise, an 'output parameter' may be any parameter that is transmitted from the composable element to the calling application, even though the 'output parameter' is a parameter that is received by the application.

An example of a composable element may be a spelling checker service. The spelling checker may be a reusable component, and may be used by multiple applications, such as a word processor, an accounting program, and a web browser, for example. When the accounting program has a text string or other data for spell checking, the accounting program may search for a spelling checker application that meets the accounting program's criteria. Similarly, the web browser may use a spelling checker to verify text entered by a user in a text input box.

Continuing with the example, the spelling checker may use a dictionary that is also complies with the application framework. In such an example, the dictionary may be called from the spelling checker, which may be called by the higher level application, resulting in a composable element that itself uses a composable element.

In the example, several different dictionaries may be available to the spelling checker. A word processing application that calls a spelling checker for a business document may use a formal English dictionary, whereas a web browser that incorporates a spelling checker for a connection to an Internet chat room may use a casual English dictionary. Similarly, an accounting application used may have a spelling checker that includes various technical terms that relate to a specific industry in order to spell check proposals or quotes, for example.

In the example, an application may search for a spelling checker service and may define the type of dictionary that may be used in the instance. For example, the word processing application may request a formal, business English dictionary for a spelling checker service. After instantiating the spelling checker service, the spelling checker service may then search for a dictionary meeting the request by the application.

The example above is one type of recursive use of the framework. The original application may use the framework to find and instantiate a spell checker, which may in turn use the framework to find and instantiate a dictionary. In some embodiments, such recursion may continue for many levels.

In order to search for a composable element, an application may define a composable element service definition 106. The composable element service definition 106 may be used to search for any composable element or composable part that matches some or all of the parameters for the service definition 106.

In many embodiments, an application may define a portion of a composable element service definition 106 and search using only that portion. After selecting a composable element, the application may import a composable element service definition from the composable element and configure input or output parameters to match the composable element.

In a simple example, an application may define a desired output from a composable element. After finding a composable element that can deliver the output, the application may read the service definition extracted from the composable element to precisely determine the parameters to send to the composable element.

In another example, an application may have a predefined input that it desires to send to a composable element, but the application may be able to handle different forms of output from the composable element. After selecting a composable element, the composable element's service definition may define the precise parameters that will be returned. The application may process the output from the composable element according to the definition, and may change the processing based on information in the service definition.

The input metadata keys 108 and output metadata keys 110 may define the parameters passed between the application 104 and a composable part. The metadata keys may define the parameters in different manners, depending on the embodiment. In a simple definition, the metadata keys may use common type definitions, such as string, integer, and real number. Some metadata keys may define composite types constructed from various primitive types and other composite types, including sub-types. Such metadata keys may use very complex type definitions in some cases.

In some cases, a metadata key may include ranges of acceptable values in the definition. For example, a value for a real number input may be constrained to be between 0 and 1. A metadata key may define a parameter that may constrained to have four distinct options, such as the values that may be found in a conventional drop down list, for example.

Many metadata keys may be defined with a name. In many cases, a conventional, human readable name may be assigned. Some metadata keys may have very specific names, and some may be assigned unique names using Globally Unique Identifiers (GUID).

The metadata keys may define a portion of a service definition or contract between the application 104 and a composable element. The contract may be fully or partially defined using the metadata keys. In some embodiments, a contract may define specific behaviors or characteristics about the operation or performance of a composable element that may or may not be defined using the metadata keys. In some such cases, the behaviors or other characteristics may be defined by a separate specification.

When a metadata key refers to a unique parameter, such as a parameter identified with a GUID, the application and composable element may both adhere to a specific and detailed contract for interoperability. When two or more composable elements accept a parameter or produce such a parameter, both composable elements would be expected to conform to the interoperability contract.

An application 104 may search for a composable element or group of composable elements that may match a composable element service definition 106. In many embodiments, an application 104 may define several composable element service definitions 106 and search for composable elements that may match.

When an application is searching for multiple composable elements, the search may be satisfied by several individual composable elements or by one or more composable parts that contain several of the individual composable elements. Each embodiment may have different search strategies and different criteria for selecting composable elements.

In many cases, a composable part that contains many of the desired composable elements may be preferred to several separate and individual composable elements. In some cases, the desired composable elements may have orthogonal operations, where orthogonal operations are those which do not relate to each other.

In the example of a spelling checker, an application may search for the following composable elements: a spelling checker and a loan calculator. At first glance, a spelling checker may have nothing to do with a loan calculator, and the two composable elements may be orthogonal to each other. A search for a spelling checker and loan calculator may identify separate spelling checker and loan calculator composable elements, as well as a financially related composable part that includes a spell checker as well as a loan calculator in a single composable part. Since both of the desired composable elements are included in the financially related composable part, the composable part may be selected in some embodiments.

In such a case, the composable part may be selected because a composable part that delivers several of the desired composable elements may be more aligned with the application's function than two separate and independent composable elements. However, two separate and independent composable elements that conform to the desired service definitions may be sufficient to perform the application's function, in some cases.

When searching for a composable element to match the composable element service definitions 128, an application may search in several different locations. Since the composable element may be a service, the application may search in locally running services 112.

The locally running services 112 may contain multiple composable parts 124, which may contain one or more composable elements 122. Each composable element 122 may contain a composable element service definition 114 and an operating service 120. The composable element service definition 114 may metadata that may be analyzed by the application 104, and may include input metadata keys 116 and output metadata keys 118.

The locally running services 112 may be have several composable parts 124 that are operating or capable of being used without having to be instantiated. A search for an appropriate composable element may analyze the composable element service definition 114 without having to query or analyze the operating service 120.

In many cases, a composable part 124 may contain a composable part definition 126. The composable part definition 126 may include metadata that describes the various composable elements, which is the composable element service definition 114. The composable part definition 126 may also include metadata that describes the composable part 124, which may include a name and in some cases a unique name such as a GUID.

In many embodiments a composable part definition 126 may contain information that can be analyzed to comply with the composable element service definitions 106, as well as information that can be used to instantiate a composable part 124. In such embodiments, an application 104 may search composable part definitions 130 which are not instantiated. Such a search may determine if one of the composable part definitions 130 contains composable elements that match the composable element service definition 106, then the composable part definition 130 may be used to instantiate a composable part 124.

The application 104 may also search composable element service definitions 128 that are the metadata for composable elements. The search may be performed without having to load a composable element into memory in order to determine the metadata, since the metadata may be defined separately in the composable element service definitions 128.

The application 104 may search local storage media, registries, and other local storage devices for the composable part definitions 130 and composable element service definitions 128. The application 104 may also search locally running services 112, which may be operating on the same processor or the same hardware platform 152 that makes up the local device 102.

The hardware platform 152 may contain a processor 154 and various memory devices 156, and may be embodied in a general purpose device such as a personal computer, notebook computer, server computer, or other similar device. In some embodiments, the hardware platform 152 may be a handheld device, such as a mobile phone, personal digital assistant, handheld scanner, or other device. Still other embodiments may include any other hardware platform capable of performing the functions of the application 104. Such hardware platforms may include one or more devices in a distributed or networked environment.

In many embodiments, the application 104 may be capable of searching remotely running services 132. The remotely running services 132 may be services available over a local area network, such as services that may be provided by a server computer attached to a network. In some embodiments, the remotely running services 132 may be web based services or services that are provided over the Internet or other wide area network.

Similar to the locally running services 112, the remotely running services 132 may contain composable parts 144 that may in turn contain multiple composable elements 140. Each composable element 140 may have an operating service 142 as well as a composable element service definition 134 that contains input metadata keys 136 and output metadata keys 138. In many embodiments, a composable part 144 may also have a composable part definition 146.

Similar to the local composable part definitions 130, remotely available part definitions 150 may be searched. In some instances, a selected composable part definition 150 may be instantiated on the local device 102, or may be instantiated on a remote device in other instances.

Remote composable element service definitions 148 may be searched by the application 104 similarly to the local composable element service definitions 128. In some instances, a selected composable element may be instantiated on the local device 102, while in other instances, the selected composable element may be instantiated on a remote device.

Embodiment 100 illustrates the various components that may be searched to match composable elements to a composable element service definition 106 as defined within an application 104. The application 104 may be able to search locally running services, as well as services that may be instantiated and run locally. In some embodiments, the application 104 may be able to search remotely running services that may be instantiated locally or remotely.

When the application 104 performs a search for a composable element, the composable element service definition 106 may partially define the requested interface for the composable element. In some cases, a desired output from a composable element may be defined without defining the inputs. In other cases, the desired input to the composable element may be defined without defining the outputs. In some cases, a portion of the inputs or a portion of the outputs may be defined.

In some embodiments, input and output metadata keys may be defined with compulsory and optional metadata keys. When optional metadata keys are present, a composable element meeting the compulsory metadata keys may be used, but a different composable element with both the compulsory and optional metadata keys may be preferred.

Embodiment 100 is an example of a framework where composable elements may be searched by analyzing metadata associated with the composable elements. The searching may identify one or more composable elements that match a composable element service definition 106 defined in an application. A selected composable element may be used if the composable element is already running, or may be instantiated and run. In some cases, groups of composable elements may be instantiated and run as a composable part.

In some embodiments, a composable element may be defined to have one and only one output. In such an embodiment, interaction with the composable element may be performed on an atomic level. In such embodiments, some complex services may be defined as composable parts with multiple composable elements. Other embodiments may allow two or more outputs from a composable element.

Figure 2:
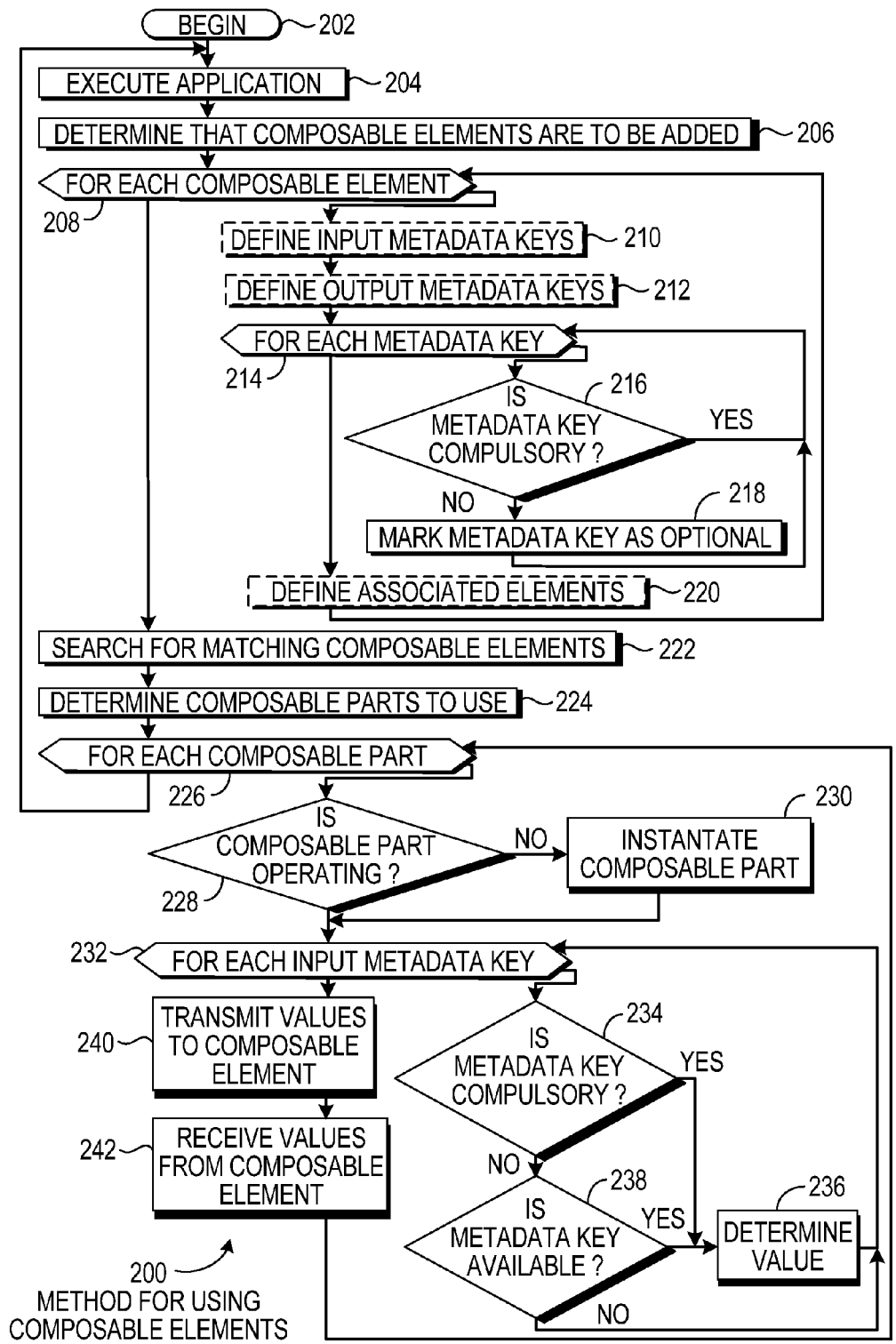
FIG. 2 is a flowchart illustration of an embodiment showing a method for using composable elements.

FIG. 2 is a flowchart illustration of an embodiment 200 showing a method for using composable elements. Embodiment 200 is a simplified example of some of the steps that may be performed by an application when searching for, selecting, and operating composable elements.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 is an example of a high level sequence by which composable elements may be found and used. The sequence of embodiment 200 may be performed by an application, and in some cases, a service may be used to facilitate the searching, selection, instantiation, and operation of composable elements. The actions described in embodiment 200 may be caused by the application.

The process may begin in block 202.

An application may be executing in block 204. During execution, it may be determined that composable elements are to be added in block 206. In many applications, an interface for a composable element may be constructed and the activities of block 206 and following may be performed when the interface is queried or otherwise actuated.

For each composable element that is to be added in block 208, the metadata keys associated with the composable element may be defined. The input metadata keys may be defined in block 210, and the output metadata keys may be defined in block 212.

In some embodiments, some input metadata keys may be defined without defining output metadata keys. In other embodiments, some output metadata keys may be defined without defining input metadata keys. In still other embodiments, both input and output metadata keys may be defined. In some embodiments, a portion of the desired input or output metadata keys may be defined.

For each metadata key in block 214, if the metadata key is not compulsory in block 216, the metadata key may be marked as optional in block 218 and the process returns to block 214. If the metadata key is compulsory in block 216, the process returns to block 214.

In block 220, any associated composable elements may be defined. Associated composable elements may be other composable elements that are related to the current composable element being operated upon in block 208. When a related composable element is defined, the relationship may be another factor for searching, in addition to the metadata keys and other metadata.

After defining the metadata keys in blocks 208-220, a search for matching composable elements may be performed in block 222. Subsequent embodiments 300 and 400 describe various mechanisms and methods for performing searches.

The search in block 222 may return multiple composable parts, and the composable parts to use may be determined in block 224. In some cases, a single composable element may be selected in block 224. In such a case, the following process may be performed on a single composable element.

The following process describes how the composable parts or composable elements may be used by the application.

For each composable part in block 226, if the composable part is not operating in block 228, the composable part may be instantiated in block 230. For each input metadata key in block 232, if the metadata key is compulsory in block 234, a value may be determined for the metadata key in block 236. If the metadata key is not compulsory in block 234, but the metadata key is available in block 238, a value is determined in block 236. If the metadata key is not compulsory in block 234 and not available in block 238, the metadata key is ignored. The process may return to block 232.

After determining values for the various metadata keys in blocks 232-238, the values are transmitted to the composable element in block 240 and values are received from the composable element in block 242. The process may return to block 226 for other composable parts. When the composable parts are completed in block 226, the process may return to block 204 for more execution.

Figure 3:
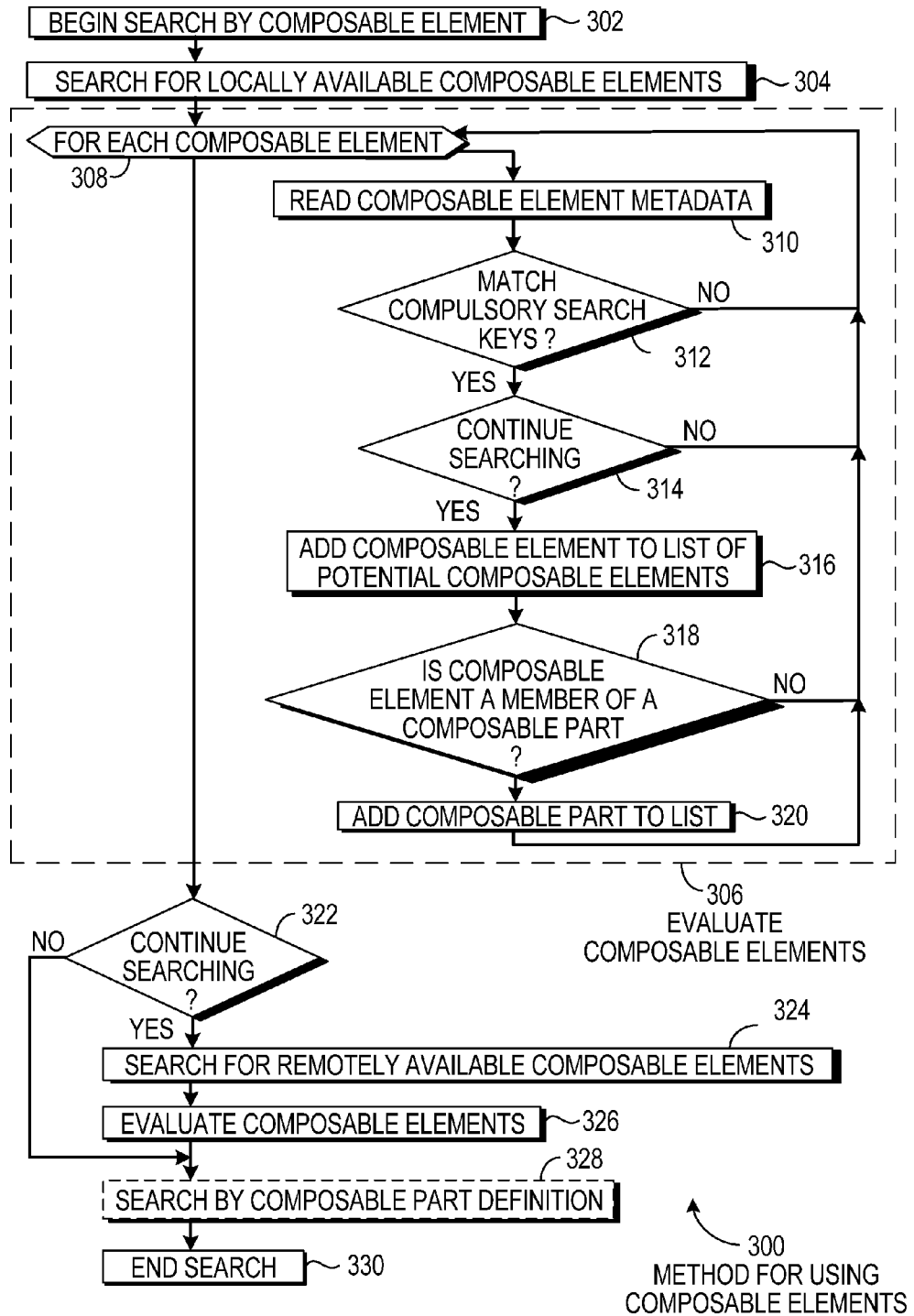
FIG. 3 is a flowchart illustration of an embodiment showing a method of searching by composable element.

FIG. 3 is a flowchart illustration of an embodiment 300 showing a method for searching by composable elements. Embodiment 300 is a simplified example of some of the steps that may be performed when searching for a composable element.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Different embodiments may perform searches for composable elements using different sequences. Embodiment 300 illustrates a method by which composable elements may be searched by looking for individual composable elements, first starting with those composable elements that are locally running. Embodiment 400, presented later in this specification, illustrates a method for searching that begins with searching composable part definitions.

Embodiment 300 is an example of searching from the smaller items and progressing to larger, where embodiment 400 may be an example of starting with the larger items and progressing to the smaller. Different embodiments may use a combination of the two search strategies, and some embodiments may use different search strategies and sequences depending on the type of composable element and other factors.

Embodiment 300 begins in block 302.

All locally available composable elements may be identified in block 304. The locally available composable elements may include composable elements that are already running on a local system as well as composable elements that are not running but may be instantiated on a local system. After identifying the local composable elements in block 304, the composable elements may be evaluated in block 306.

In block 306, for each composable element in block 308, the composable element metadata may be read in block 310. The searching mechanism may use metadata for composable elements in the form of composable element service definitions. The metadata may be read and evaluated without having to load the composable element into memory and executing the composable element. This mechanism may allow large numbers of composable elements to be evaluated in a short period of time.

If the metadata keys in the composable element metadata do not match the keys for which the search is being performed in block 312, the next composable element is evaluated in block 308.

If the metadata keys in the composable element metadata do match the compulsory keys in block 312, a decision in block 314 is made to continue searching or not. If no more searching is performed in block 314, the process may return to block 308 and the search may end.

The decision in block 314 to continue searching or not may be one option in a search strategy. If the compulsory keys are matched in block 312, the search may end in block 314 with the first composable element that meets the minimum criteria. If the search is not ended in block 314, it is possible that two or more composable elements may be found. Each embodiment may have different search criteria and different search strategies.

If searching is to continue in block 314, the composable element may be added to a list of potential composable elements in block 316.

If the selected composable element is a member of a composable part in block 318, the composable part is added to the list of potential composable parts in block 320. If the selected composable element is not a member of a composable part in block 318, block 320 is skipped. The process may return to block 308 to process the next composable element.

The list of potential composable elements and parts may be evaluated to select the best fit out of all the potential candidates. Such an evaluation may be performed, for example, in block 224 of embodiment 200. The evaluation and selection of potential candidates may be performed using any type of criteria, sorting algorithm, or other selection mechanism.

After evaluating local composable elements in block 306, a decision may be made in block 322 to continue searching. If a decision in block 322 indicates that searching may continue, remotely available composable elements may be found in block 324 and evaluated in block 326. In many embodiments, the process of evaluating composable elements 306 may be performed in block 326 for the remotely available composable elements.

If searching is not to continue in block 322, or when the remotely available composable elements have been evaluated in block 326, a search may be performed on composable part definitions in block 328, and the search may end in block 330. In other embodiments, the search by composable part definitions in block 328 may be performed before the search by composable element of embodiment 300.

One embodiment of a search by composable part definitions of block 328 may be shown in embodiment 400 later in this specification.

Figure 4:
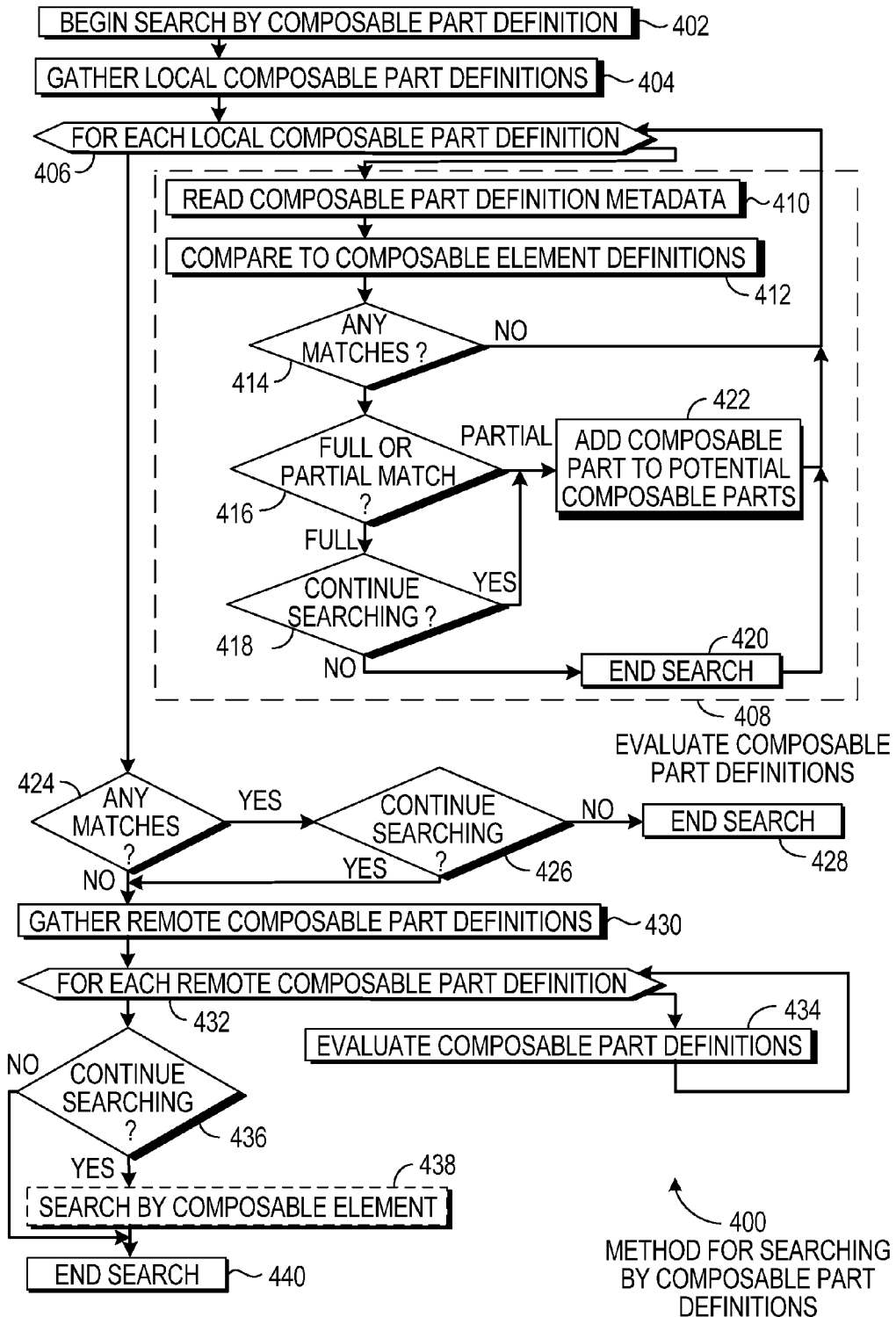
FIG. 4 is a flowchart illustration of an embodiment showing a method of searching by composable part definitions.

FIG. 4 is a flowchart illustration of an embodiment 400 showing a method for using composable part definitions. Embodiment 400 is a simplified example of some of the steps that may be performed by an application when searching for, selecting, and operating composable elements from within composable part definitions.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 is an example of a method for searching by composable part definitions. In some embodiments, a search may be performed using composable part definitions prior to or in lieu of searching by individual composable elements, as in embodiment 300. In other embodiments, searching may be performed by individual composable elements prior to or in lieu of searching by individual composable elements. Other embodiments may combine portions of each embodiment 300 and 400, or may have a different search strategy.

The process of embodiment 400 attempts to find a composable part definition that meets all of the criteria for all of the metadata keys defined by the application. If a single composable part definition matches the criteria, the search may end there. If a composable part definition contains some of the requested composable elements, the composable part definition may be added to a list of potential composable parts. In some embodiments, the search may continue to identify all potential candidates and a sorting and selection process may be performed, such as in block 224 of embodiment 200.

The search by composable part definition may begin in block 402.

In block 404, local composable part definitions may be gathered together. The local composable part definitions may include the metadata for operating composable parts, as well as composable part definitions for composable parts that are not yet instantiated.

Each composable part definition may be processed in block 406 and evaluated in block 408. In block 408, the metadata contained in the composable part definition may be read in block 410. The composable part definition may be compared to the composable element definitions created by the application in block 412. If no matches exist in block 414, the process may return to block 406 to process the next composable part definition.

If matches do exist in block 414, and the match is a full match in block 416, a decision may be made in block 418 to continue searching. In some embodiments, if a full match is made, the search may be ended in block 420. In other embodiments, the search may add the composable part to a list of potential composable parts in block 422. The process may return to block 406 to process the next composable part. In cases where the search ends in block 420, the loop of block 406 may be terminated.

If matches were found in block 406, a decision may be made in block 426 to continue searching. If the search is to be discontinued in block 426, the search may end in block 428. If the search is to be continued in block 426 or if no matches were found in block 406, definitions for remote composable parts may be gathered in block 430.

The remote composable parts may be those composable parts that are operating or could be instantiated to operate on remote servers, including web services available over the Internet, services provided on servers attached to a local area network, or any other device. In some cases, the remote composable part definitions may be available remotely but may be capable of being operated locally when instantiated.

For each remote composable part definition in block 432, the composable part definition may be evaluated in block 434. The process of block 434 may be similar to the process of block 408 used for evaluating the local composable part definitions.

Another decision may be reached in block 430 to continue searching. If searching is to be continued in block 430, some embodiments may search by composable element in block 438. An embodiment of searching by composable element was discussed in embodiment 300. If the decision in block 430 is to stop searching, the search may end in block 440.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A computer readable medium storing computer executable instructions operable on a computer processor, the computer executable instructions configured to perform operations, the operations comprising:

receiving a first service definition comprising metadata keys, wherein at least some of the metadata keys include an output parameter for a composable part, and wherein the composable part includes a group of composable elements and exposes a metadata description of at least one of the group of composable elements or a metadata description of the composable part;

searching for a second service definition matching the first service definition, wherein the second service definition is associated with a first composable part;

determining a first metadata key comprising a first input parameter definition;

creating a first input value matching the first metadata key;

instantiating the first composable part;

transferring the first input value to the first composable part; and receiving a value for the output parameter from the first composable part, wherein the computer readable medium does not comprise a signal per se.

2. The computer readable medium of claim 1, wherein the first service definition comprises at least one optional metadata key.

3. The computer readable medium of claim 1, wherein the determining the first metadata key, includes:

receiving a service definition from the first composable part; and determining the first metadata key from the service definition.

4. The computer readable medium of claim 1, wherein the first service definition includes a unique identifier.

5. The computer readable medium of claim 1, wherein the searching is performed without loading the first composable part into memory.

6. The computer readable medium of claim 5, wherein the searching is performed without loading the first composable part into memory by employing separately defined metadata of a composable element service definition.

7. The computer readable medium of claim 1, wherein the first input parameter definition is defined at least in part by a type.

8. The computer readable medium of claim 1, wherein the first input parameter definition is defined at least in part by a range.

9. The computer readable medium of claim 1, wherein the first input parameter definition includes a unique identifier.

10. The computer readable medium of claim 9, wherein the unique identifier comprises a GUID.

11. The computer readable medium of claim 1, wherein the composable part exposes a metadata description of a sum associated with the group of composable elements.

12. A method comprising:
defining a first service definition and a second service definition, wherein each of the first service definition and the second service definition comprises metadata keys, wherein at least some of the metadata keys include an output parameter, wherein the first service definition and the second service definition are further defined to be in a composable part, and wherein the composable part includes a group of composable elements and exposes a metadata description of at least one of the group of composable elements or a metadata description of the composable part;
searching for a third service definition matching the first service definition, wherein the third service definition is associated with a first composable element;
searching for a fourth service definition matching the second service definition, wherein the fourth service definition is associated with a second composable element;
determining a first metadata key comprising a first input parameter definition;
creating a first input value matching the first metadata key;
instantiating the first composable element;
transferring the first input value to the first composable element;
receiving a value for a first output parameter from the first composable element;
determining a second metadata key comprising a second input parameter definition;
creating a second input value matching the second metadata key;
instantiating the second composable element;
transferring the second input value to the second composable element; and
providing a value for a second output parameter from the second composable element to an application that caused the second composable element to be instantiated.

13. The method of claim 12, wherein the third service definition and the fourth service definition are found in one of a group composed of a first composable part and a first composable part definition.

14. The method of claim 13, wherein the first service definition and the second service definition are orthogonal.

15. The method of claim 13, wherein the first service definition comprises at least one optional metadata key.

16. The method of claim 12, wherein the searching for the third service definition is performed without loading the composable part into memory.

17. The method of claim 12, wherein the second service definition is defined within the first composable element.

18. A system comprising:
a processor configured to perform a method comprising:
searching for a first service definition matching a set of metadata keys, wherein at least one of the set of metadata keys defines an input parameter, and wherein the searching comprises examining metadata related to a plurality of composable elements;
selecting a first composable element from the plurality of composable elements based on the set of metadata keys, wherein the first composable element is contained in a composable part, and wherein the composable part includes a group of composable elements and exposes a metadata description of at least one of the group of composable elements or a metadata description of the composable part;
instantiating the first composable element;
determining a first input value for a first parameter, wherein the first input value conforms to a given one of the at least one of the set of metadata keys associated with the first parameter, and wherein the given one of the at least one of the set of metadata keys is defined in metadata associated with the first composable element;
transferring the first input value to the first composable element; and
providing a first output value from the first composable element to an application that caused the first composable element to be instantiated.

19. The system of claim 18, wherein the searching is performed without loading the composable part into memory.

20. The system of claim 18, wherein the method further comprises:
examining the given one of the at least one of the set of metadata keys to determine a plurality of acceptable values for the first parameter; and
selecting one of the plurality of acceptable values for the first parameter.

21. The system of claim 18, wherein the set of metadata keys is defined in a service object.

22. The system of claim 18, wherein the first composable element is defined in a service object.

* * * * *